United States Patent
Ketty et al.

(10) Patent No.: US 11,299,423 B1
(45) Date of Patent: Apr. 12, 2022

(54) PHOTOLUMINESCENT SAND

(71) Applicants: Alex Ketty, West Bloomfield, MI (US); John Ketty, West Bloomfield, MI (US)

(72) Inventors: Alex Ketty, West Bloomfield, MI (US); John Ketty, West Bloomfield, MI (US)

(73) Assignee: Glow Path Pavers, LLC, West Bloomfield, MI (US)

( * ) Notice: Subject to any disclaimer, the term of this patent is extended or adjusted under 35 U.S.C. 154(b) by 0 days.

(21) Appl. No.: 17/323,635

(22) Filed: May 18, 2021

Related U.S. Application Data

(63) Continuation-in-part of application No. 16/811,776, filed on Mar. 6, 2020, and a continuation-in-part of application No. 16/782,112, filed on Feb. 5, 2020.

(51) Int. Cl.

| | | |
|---|---|---|
| C04B 18/02 | (2006.01) |
| C04B 14/06 | (2006.01) |
| C04B 16/04 | (2006.01) |
| C04B 14/22 | (2006.01) |
| E01F 9/559 | (2016.01) |
| C09D 5/33 | (2006.01) |
| C09D 5/22 | (2006.01) |
| C09K 11/02 | (2006.01) |
| C09K 11/06 | (2006.01) |
| C09K 11/08 | (2006.01) |
| E01C 17/00 | (2006.01) |
| C09K 11/59 | (2006.01) |
| C04B 111/80 | (2006.01) |
| C04B 103/54 | (2006.01) |

(52) U.S. Cl.
CPC ............ *C04B 18/022* (2013.01); *C04B 14/06* (2013.01); *C04B 14/22* (2013.01); *C04B 16/04* (2013.01); *C09D 5/004* (2013.01); *C09D 5/22* (2013.01); *C09K 11/02* (2013.01); *C09K 11/06* (2013.01); *C09K 11/08* (2013.01); *C09K 11/59* (2013.01); *E01C 17/00* (2013.01); *E01F 9/559* (2016.02); *C04B 2103/54* (2013.01); *C04B 2111/807* (2013.01)

(58) Field of Classification Search
CPC ......... E01F 9/559; C09K 11/02; C09K 11/06; C09K 11/08; C09K 11/59; C04B 18/022; C04B 14/06; C04B 14/22; C04B 16/04; C04B 2103/54; C04B 2211/807
See application file for complete search history.

(56) References Cited

U.S. PATENT DOCUMENTS

| | | | | |
|---|---|---|---|---|
| 3,707,583 A | * | 12/1972 | McKown | C08L 2666/08 427/486 |
| 6,462,164 B1 | * | 10/2002 | Shah | C07D 233/64 528/112 |
| 2005/0160637 A1 | * | 7/2005 | Hesse | G09F 13/20 40/124.5 |
| 2021/0039994 A1 | * | 2/2021 | Tutino | E01C 5/003 |

FOREIGN PATENT DOCUMENTS

CN 106243869 * 12/2016

OTHER PUBLICATIONS

Dirtgluedry-Overview, 2021.*
Translation for CN 106243869, Dec. 21, 2016.*
DirtGlueDry pages from Global Environment Solutions, 2020 and an article from Jan. 19, 19 about DirtGlueDry from Global Environment Solutions.*
Global Enviromental Solutions, "Comparing DirtGlue Polymer With Other Latex Polymer Emulsions On the Market", Apr. 26, 2018.*

* cited by examiner

*Primary Examiner* — C Melissa Koslow
(74) *Attorney, Agent, or Firm* — Michael D. Eisenberg

(57) ABSTRACT

Photoluminescent sand preferably includes play sand, photoluminescent pigment, a powdered binder and a curing agent. The play sand is preferably mixed with the photoluminescent pigment to form a photo sand mix. The photo sand mix is then mixed with the powered binder and curing agent to form the photoluminescent sand mix. The photoluminescent sand mix is allowed to cure for between 3-7 days to form the photoluminescent sand.

13 Claims, 2 Drawing Sheets

PHOTOLUMINESCENT SAND

CROSS-REFERENCES TO RELATED APPLICATIONS

This is a continuation-in-part patent application taking priority from patent application Ser. No. 16/811,776 filed on Mar. 6, 2020, which takes priority from patent application Ser. No. 16/782,112 filed on Feb. 5, 2020.

BACKGROUND OF THE INVENTION

1. Field of the Invention

The present invention relates generally to outdoor surface construction and more specifically to mortar and block products made with photoluminescent products, which includes a mortar mix, polymeric sand, pavers, coping blocks, concrete blocks and ceramic tile that provide illumination without the need for electrical power.

2. Discussion of the Prior Art

Paving blocks are used for walkways, large public pedestrian areas, driveways, paths and the like. The paving blocks allow ground action without deterioration. Paving blocks, like cement blocks for pathways, can be laid in various patterns that are aesthetically pleasing. Walkway lighting for pathways have been used along with paving blocks to increase safety, provide sure footing and visibility. Many walkways are illuminated with low or medium voltage lighting, and must be furnished with low- or medium voltage electricity to power an illumination system. There are electrical consumption costs associated with the use of illumination systems. There are also difficulties in setup of the illumination system, if the walkway is a long walkway or is located at a distance from an electrical connection. A licensed contractor must be hired to install electrical supplies for the illumination system.

The use of outdoor lighting is known in the prior art. For example, U.S. Pat. No. 6,027,280 to Connors et. al (Connors) discloses an interlocking paving block with interior illumination capability. However Conners does not allow for non-electrical use of an outdoor light. Similarly, U.S. Pat. No. 5,472,737 to Anders (Anders 737) discloses a photoluminescent highway paint composition that is painted on highways to aid in driving. However, Anders 737 does not disclose the use of paving blocks. Lastly, U.S. Pat. No. 6,005,024 to Anders et al (Anders 024) discloses a photoluminescent overlay that covers existing signs and gives moisture stability to the phosphorescent materials. However, Anders 024 does not disclose the use of paving blocks.

While the above-described devices fulfill their respective objections and requirements, the aforementioned patents do not describe a photoluminescent paving block that allows for being used for outdoor lighting. Connors makes no provision for non-electrical use, since it includes an insect bulb and wiring. Anders 737 and 024 only disclose the use of photoluminescent material in conjunction with paving blocks.

Additionally, U.S. Pat. No. 6,665,986 to Kaplan discloses a phosphorescent paving block. Patent publication no. 2006/0065879 to Beimel discloses a luminous cementitious composition and methods of making and using the same. U.S. Pat. No. 8,617,638 to Hill discloses a method of manufacturing photoluminescent pavers at a paver manufacturing facility. However, U.S. Pat. No. 9,114,422 to Toma et al. discloses a paving block with embedded photoluminescent material. U.S. Pat. No. 9,114,422 is hereby incorporated by reference in its entirety. U.S. Pat. No. 10,519,612 to Toma discloses a paving block with improved illumination, which is hereby incorporated by reference in its entirety.

Accordingly, there is a clearly felt need in the art for mortar and block products made with photoluminescent products, which includes a mortar mix, polymeric sand, photoluminescent sand, pavers, coping blocks, concrete block, fascia panels and ceramic tile that provide illumination without the need for electrical power.

SUMMARY OF THE INVENTION

The present invention provides mortar and block products made with photoluminescent products, which includes a mortar mix, polymeric sand, pavers, coping block, concrete block, fascia panels and ceramic tile. The mortar and block products made with photoluminescent sand replaces the need for regular sand in such products as a mortar mix, pavers, concrete blocks, coping blocks, ceramic tile, fascia panel and polymeric sand. However, if photoluminescent polymer chips or photoluminescent glass is used, but not photoluminescent sand, regular sand must be used. The photoluminescent sand may be purchased from at least one manufacturer. Photoluminescent mortar mix preferably includes the photoluminescent sand, cement and fine aggregate. The photoluminescent paver preferably includes at least one of photoluminescent sand, photoluminescent polymer chips and photoluminescent glass; aggregate; cement; water; pigment and regular sand if photoluminescent sand is not used. The photoluminescent concrete block preferably includes at least one of photoluminescent sand, photoluminescent polymer chips and photoluminescent glass; aggregate; gravel; cement; water; and regular sand if photoluminescent sand is not used. The photoluminescent coping block preferably includes at least one of photoluminescent sand, photoluminescent polymer chips and photoluminescent glass; aggregate; cement; water; pigment; and regular sand if photoluminescent sand is not used.

The photoluminescent ceramic tile preferably includes clay, at least one of photoluminescent sand, photoluminescent polymer chips and photoluminescent glass; feldspar; water; and regular sand if photoluminescent sand is not used. The photoluminescent fascia panel preferably includes a base portion and a fascia portion. The fascia panel is typically used on an outside surface of a retainer wall. The base portion preferably includes sand, aggregate, gravel, cement; and water. The fascia portion preferably includes small gravel, cement, water and at least one of photoluminescent sand, photoluminescent polymer and chips photoluminescent glass. Photoluminescent polymeric sand preferably includes photoluminescent sand, polymer binder and quartz silica. However, Portland cement may also be added to the photoluminescent polymeric sand. Photoluminescent polymer chips and/or glass are used to enhance the photoluminescent effect and appearance.

Photoluminescent sand preferably includes play sand, photoluminescent pigment, a powdered binder and a curing agent. The photoluminescent pigment may be replaced with photoluminescent resin or photoluminescent glass. The play sand is preferably mixed with the photoluminescent pigment to form a photo sand mix. The photo sand mix is then mixed with the powdered binder and the curing agent to form a photoluminescent sand mix. The photoluminescent sand mix is allowed to cure at the time of use for between 3-7 days after the addition of water.

Accordingly, it is an object of the present invention to provide mortar and block products made with photoluminescent products, which includes mortar, polymeric sand, pavers, coping block, concrete block, fascia panels and ceramic tile that provide illumination without the need for electrical power.

These and additional objects, advantages, features and benefits of the present invention will become apparent from the following specification.

DETAILED DESCRIPTION OF THE PREFERRED EMBODIMENTS

The mortar and block products made with photoluminescent sand replaces regular sand in such products as mortar, pavers, concrete blocks, coping blocks, ceramic tile, fascia panel and polymeric sand. The photoluminescent sand, photoluminescent polymer chips and photoluminescent glass may be purchased from Zhejiang Minhui luminous Technology Co., LTD of Lanxi City, Zhejiang China. Photoluminescent mortar preferably includes the photoluminescent sand, cement and fine aggregate. The photoluminescent mortar mix is combined with water at the time of use to create photoluminescent mortar. The photoluminescent paver preferably includes at least one of photoluminescent sand, photoluminescent polymer chips and photoluminescent glass; aggregate; cement; water; pigment and regular sand if photoluminescent sand is not used. The photoluminescent sand or regular sand is preferably pre-moistened before mixing with the other elements. The water is mixed with the at least one of photoluminescent sand, photoluminescent polymer chips and photoluminescent glass, the aggregate, the cement and the pigment to form an uncured mixture. The uncured mixture is poured in a paver block mold, pressurized and vibrated. If the photoluminescent polymer chips or photoluminescent glass are used in the paver, a top of the paver is preferably ground to enhance illumination thereof.

The photoluminescent concrete block preferably includes at least one of photoluminescent sand, photoluminescent polymer chips and photoluminescent glass; aggregate; gravel; cement; water; and regular sand if photoluminescent sand is not used. The water is mixed with the at least one of photoluminescent sand, photoluminescent polymer chips and photoluminescent glass, the aggregate, the gravel and the cement to form an uncured mixture. The uncured mixture is poured in a block mold, pressurized and vibrated.

The photoluminescent coping block preferably includes at least one of photoluminescent sand, photoluminescent polymer chips and photoluminescent glass; aggregate; cement; water; pigment; and regular sand if photoluminescent sand is not used. The photoluminescent sand or regular is preferably pre-moistened before mixing with the other elements. The water is mixed with the at least one of photoluminescent sand, photoluminescent polymer chips and photoluminescent glass, the aggregate, the cement and the pigment to form an uncured mixture. The uncured mixture is poured in a coping block mold, pressurized and vibrated. If the photoluminescent polymer chips or photoluminescent glass are used in the coping block, a top of the coping block is ground to enhance illumination thereof.

Figure 1:
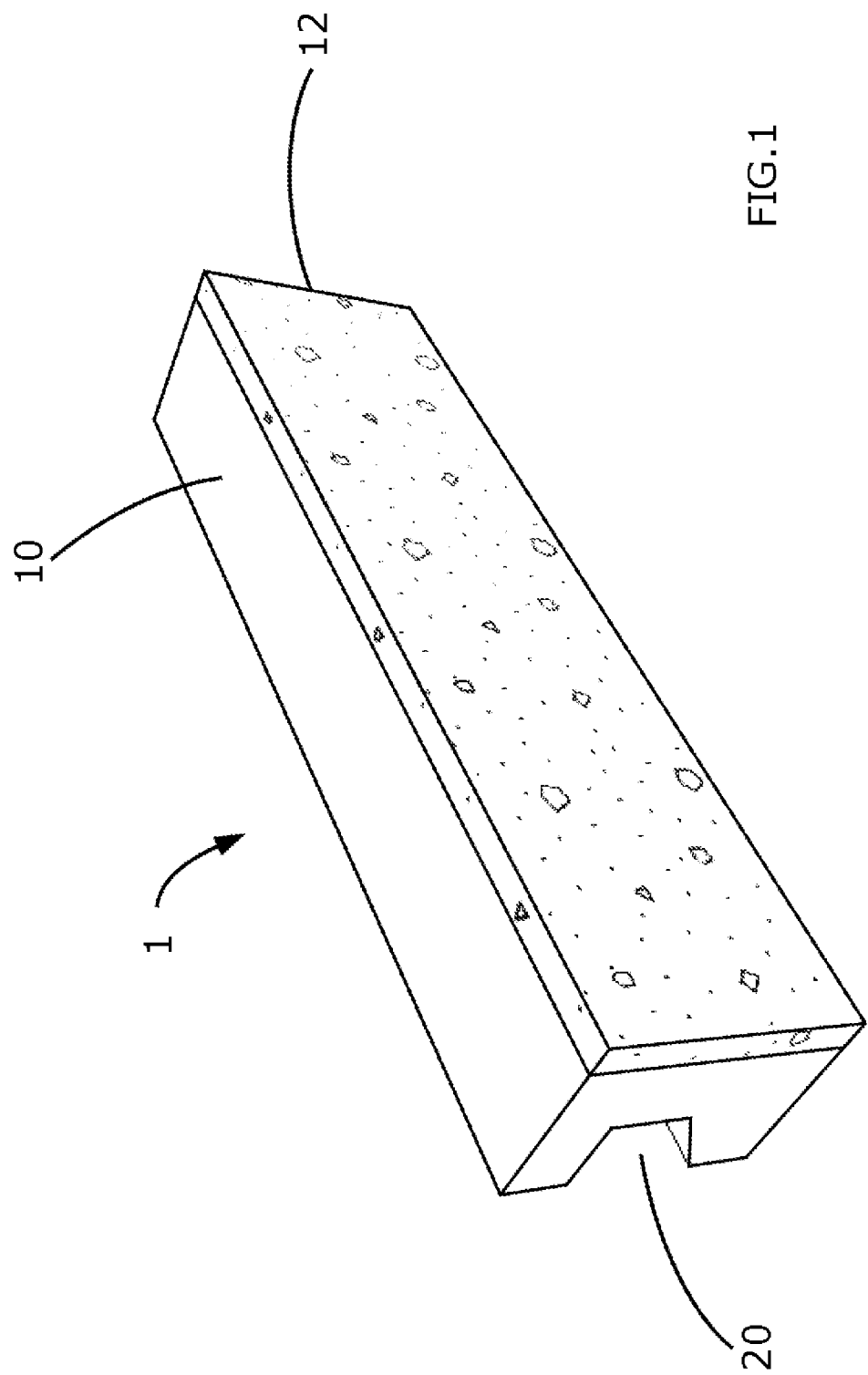
FIG. 1 is a perspective view of a fascia panel for a retainer wall in accordance with the present invention.
Figure 2:
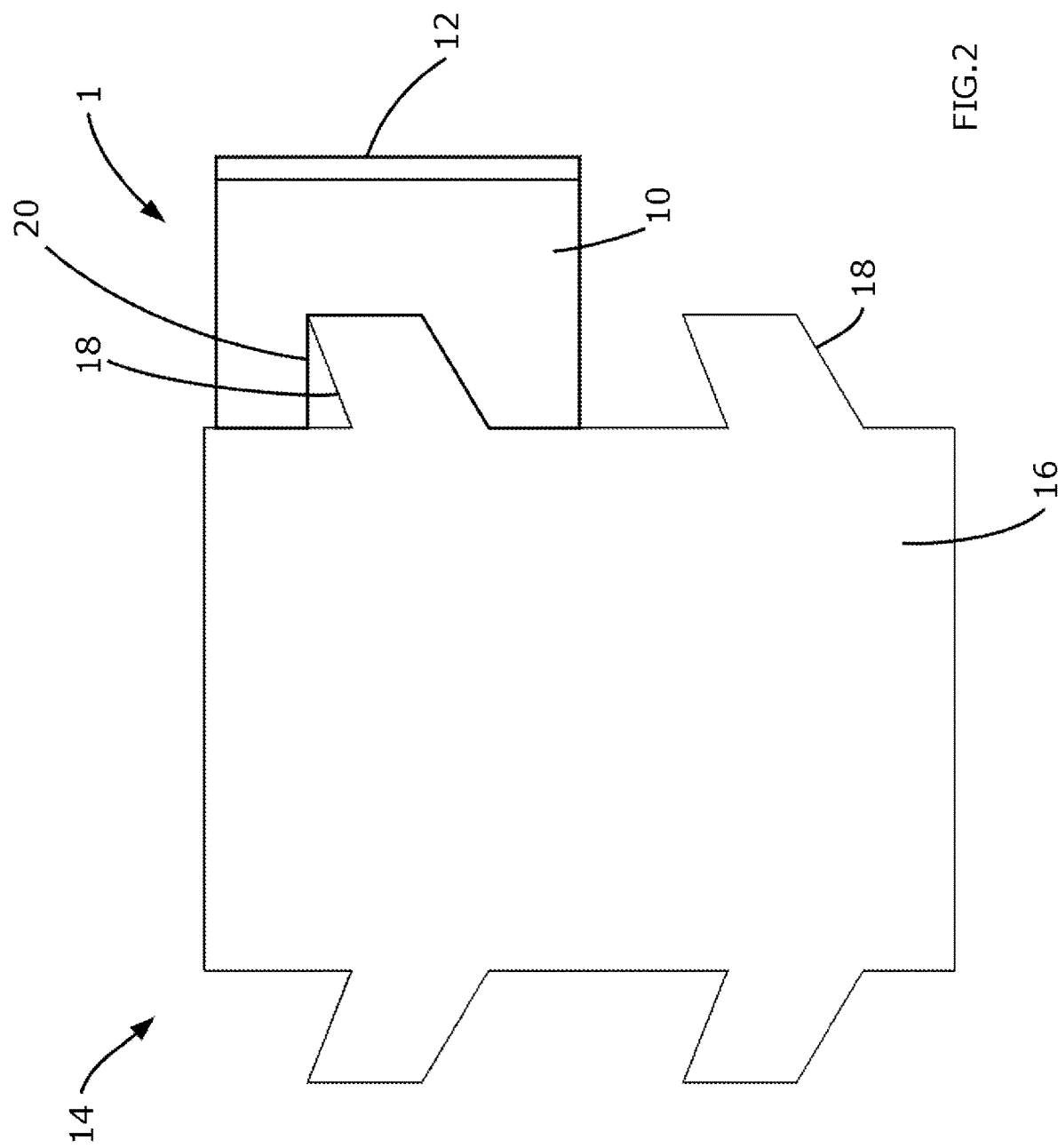
FIG. 2 is an end view of a fascia panel retained on a base block of a retainer wall in accordance with the present invention.

Photoluminescent ceramic tile preferably includes clay, at least one of photoluminescent sand, photoluminescent polymer chips and photoluminescent glass; feldspar water; and regular sand if photoluminescent sand is not used. The mixture is fired to form at least one ceramic tile. With reference to FIGS. 1-2, the photoluminescent fascia panel 1 preferably includes a base portion 10 and a fascia portion 12. A retainer wall 14 is made from a plurality of base blocks 16 and a plurality of fascia panels 1. At least one support projection 18 extends from a side of the base block 16. At least one support groove 20 is formed in a rear of said base portion 10 for hanging the fascia panel 1 on the at least one support projection 18. The base portion 10 preferably includes sand, aggregate, gravel, cement; and water. The fascia portion 12 preferably includes small gravel, cement, water and at least one of photoluminescent sand, photoluminescent polymer and chips photoluminescent glass. The components of the fascia portion 12 are mixed and poured into a fascia mold. The fascia portion mix is allowed to cure. The components of the base portion 10 are mixed and poured on top of the fascia panel mix and allowed to cure to form photoluminescent fascia panel 1. A bottom of the fascia mold may be textured. Photoluminescent polymeric sand preferably includes photoluminescent sand, polymer binder and quartz silica. Portland cement may also be added to the photoluminescent polymeric sand. The photoluminescent polymeric sand is mixed with water and then poured into spaces between pavers or blocks.

Photoluminescent sand preferably includes play sand, photoluminescent pigment, a powdered binder and a curing agent. The play sand (child's sandbox sand) may be purchased from Quikrete. The play sand has a granulation of up to 2 mm. However, other sands may also be used. The photoluminescent pigment has a granulation size of 0.3 mm to 0.9 mm. The photoluminescent pigment may be replaced with crushed photoluminescent glass or photoluminescent resin. The photoluminescent glass is manufactured with photoluminescent pigment. The photoluminescent resin is made from photoluminescent pigment mixed with some type of polymer. The photoluminescent glass and the photoluminescent resin have the same particle size as the photoluminescent pigment. Satisfactory results have been found when using DirtGlueDry™ for the powdered binder, which includes acrylate-based polymer and is manufactured by Global Environmental Solutions, but other powdered binders may also be used. Satisfactory results have been found when using Polycure™ for the water-activated curing agent, which includes benzoic acid, 3,3'-methylene bis (6 amino, dimethyl ester) and is manufactured by SpecChem, but other curing agents may also be used.

The following parameters are given by way of example and not by way of limitation. Satisfactory results have been found with the following two formulas. Formula I includes 91.5% of play sand, 5% of photoluminescent pigment, 3% powdered binder and 0.5% of curing agent all by weight. Formula II includes 89% of play sand, 5% of photoluminescent pigment, 5% of powdered binder and 1% of curing agent all by weight. The play sand is preferably mixed for five minutes at 500 rpm in a V-blender. The play sand is preferably mixed with the photoluminescent pigment to form a photo sand mix for five minutes at 500 rpm in the V-blender. The photo sand mix is then mixed with the powdered binder and curing agent to form a photoluminescent sand mix for fifteen minutes at 500 rpm. Formula I is discharged into a bag for storage and allowed to cure at the time of use for 7 days after the addition of water. Formula II is discharged into a bag for storage and allowed to cure at the time of use for 3 days after the addition of water.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

What is claimed is:

1. A method of manufacturing a photoluminescent sand comprising the steps of:
   providing sand;
   providing a water activated powdered binder comprising acrylate-based polymer;
   providing a water activated curing agent comprising benzoic acid, 3,3'-methylene bis (6 amino, dimethyl ester);
   mixing photoluminescent pigment or photoluminescent glass particles with said sand to form a photo sand mix; and
   mixing said powdered binder and said curing agent with said photo sand mix to form uncured photoluminescent sand;
   wherein said photoluminescent pigment or said photoluminescent glass particles has a granulation of between 0.3 mm to 0.9 mm;
   wherein said uncured photoluminescent sand is configured to be cured by being combined with water at time of use.

2. The method of manufacturing a photoluminescent sand of claim 1 comprising the step of:
   curing said uncured photoluminescent sand by combining said uncured photoluminescent sand with water at time of use.

3. The method of manufacturing a photoluminescent sand of claim 1 wherein:
   said sand has a granulation of up to 2 mm.

4. The method of manufacturing a photoluminescent sand of claim 1, comprising, prior to mixing photoluminescent pigment or photoluminescent glass particles with said sand:
   mixing said sand for a period of 5 minutes.

5. A method of manufacturing a photoluminescent sand comprising the steps of:
   providing sand in a percentage of between 89-91.5 by weight;
   providing a water activated powdered binder in a percentage of 3-5 by weight, the powdered binder comprising acrylate-based polymer;
   providing a water-activated curing agent in a percentage of 0.5-1 by weight, the curing agent comprising benzoic acid, 3,3'-methylene bis (6 amino, dimethyl ester);
   mixing photoluminescent pigment in an amount of 5 percent by weight with said sand to form a photo sand mix; and
   mixing said powdered binder and said curing agent with said photo sand mix to form uncured photoluminescent sand;
   wherein the uncured photoluminescent sand is configured to be cured by being combined with water at time of use.

6. The method of manufacturing a photoluminescent sand of claim 5 comprising the step of:
   curing said uncured photoluminescent sand by combining said uncured photoluminescent sand with water at time of use.

7. The method of manufacturing a photoluminescent sand of claim 5 wherein:
   said sand has a granulation of up to 2 mm.

8. The method of manufacturing a photoluminescent sand of claim 5 wherein:
   said photoluminescent pigment has a granulation of between 0.3 mm to 0.9 mm.

9. The method of manufacturing a photoluminescent sand of claim 5, comprising, prior to mixing photoluminescent pigment with said sand:
   mixing said sand for a period of 5 minutes.

10. A method of manufacturing a photoluminescent sand comprising the steps of:
    providing sand;
    providing a water activated powdered binder comprising acrylate-based polymer;
    providing a water-activated curing agent comprising benzoic acid, 3,3'-methylene bis (6 amino, dimethyl ester);
    mixing photoluminescent pigment, or photoluminescent glass particles with said sand for a period of 5 minutes to form a photo sand mix; and
    mixing said powdered binder and said curing agent with said photo sand mix for a period of 15 minutes to form uncured photoluminescent sand;
    said photoluminescent, or said photoluminescent glass particles has a granulation of between 0.3 mm to 0.9 mm;
    wherein said uncured photoluminescent sand is configured to be cured by being combined with water at time of use.

11. The method of manufacturing a photoluminescent sand of claim 10 comprising the step of:
    curing said uncured photoluminescent sand by combining said uncured photoluminescent sand with water at time of use.

12. The method of manufacturing a photoluminescent sand of claim 10 wherein:
    said sand has a granulation of up to 2 mm.

13. The method of manufacturing a photoluminescent sand of claim 10, comprising, prior to mixing photoluminescent pigment, or photoluminescent glass particles with said sand:
    mixing said sand for a period of 5 minutes.

* * * * *